United States Patent [19]
van Heel

[11] 4,270,523
[45] Jun. 2, 1981

[54] HEAT STORAGE APPARATUS AND HEAT EXCHANGER ELEMENT FOR USE THEREIN

[75] Inventor: Joannes M. van Heel, Rotterdam, Netherlands

[73] Assignee: Stichting Bouwcentrum, Rotterdam, Netherlands

[21] Appl. No.: 19,461

[22] Filed: Mar. 9, 1979

[30] Foreign Application Priority Data

Mar. 23, 1978 [NL] Netherlands .......................... 7803171

[51] Int. Cl.³ .......................... F24J 3/02; F28D 21/00
[52] U.S. Cl. .................... 126/435; 126/436; 165/104.17
[58] Field of Search ................... 165/104 S; 126/435, 126/436, 400

[56] References Cited
U.S. PATENT DOCUMENTS

| 2,597,744 | 5/1952 | Morrison | 165/104 S X |
| 3,937,017 | 2/1976 | Beschorner et al. | 165/104 S X |
| 4,131,158 | 12/1978 | Abhat et al. | 126/400 X |
| 4,153,047 | 5/1979 | Dumbeck | 165/104 S X |

*Primary Examiner*—Albert W. Davis
*Attorney, Agent, or Firm*—Weingarten, Maxham & Schurgin

[57] ABSTRACT

A heat storage apparatus comprising a plurality of heat exchanger elements mounted in a housing. Each element has a central portion containing a storage medium, surrounded by portions through which a first and a second heat transfer fluid can be passed in heat contact with said storage medium. Means are provided for passing the heat transfer fluids from respective supply conduits through the apparatus through the respective portions of the heat exchanger elements to respective discharge conduits.

27 Claims, 5 Drawing Figures

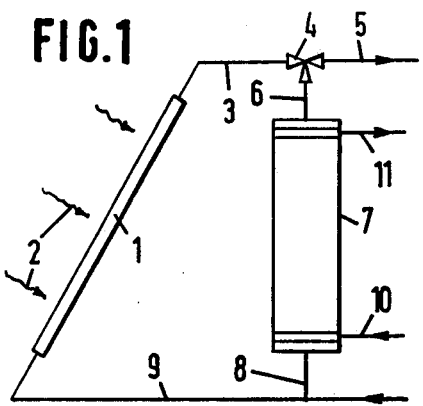
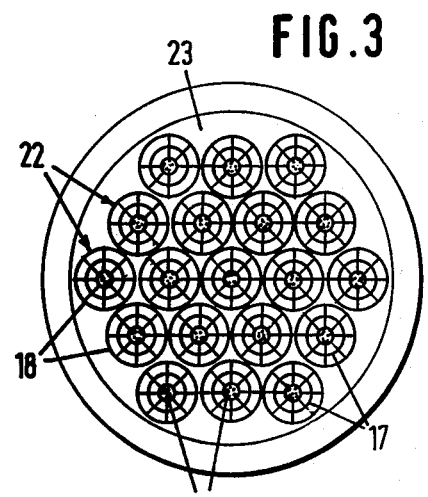
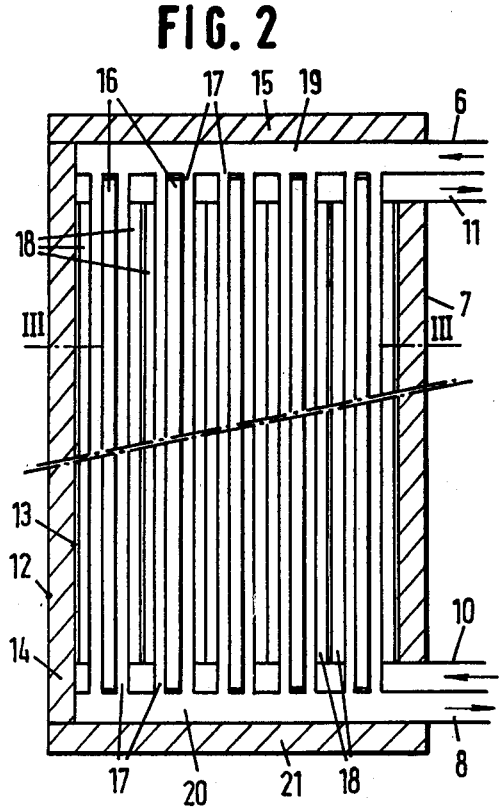
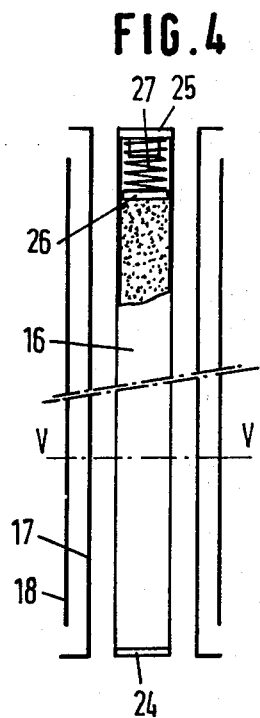
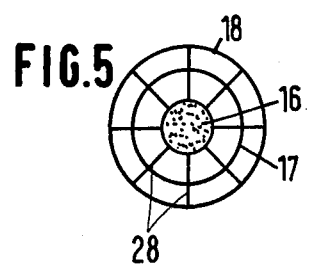

HEAT STORAGE APPARATUS AND HEAT EXCHANGER ELEMENT FOR USE THEREIN

This invention relates to an apparatus for storing solar heat collected by means of at least one collector.

A prior apparatus for storing heat comprises a housing or vessel containing a heat storgae medium which occupies at least part of the volume of said housing or vessel, means for supplying a heat transfer fluid from the collector, means for passing the transfer fluid through the apparatus in heat contact with the storage medium, means for discharging the transfer fluid to the collector, and means for passing a second heat transfer fluid through the apparatus in heat contact with the storage medium, and discharging it from the apparatus for further utilization.

Such a heat storage apparatus is well-known, and is frequently used in systems for heating buildings by means of solar heat. In such systems, solar heat is collected by one or more collectors, disposed at a suitable location, for example, on the roof of the building. Through the collector or collectors, a heat transfer fluid or heat transporting fluid is pumped. As the heat transporting fluid, air or water is often used. The heat transporting fluid is warmed up in each collector. From the collector, the fluid is conducted to the rooms in the building which are to be heated. If there is no need for direct utilization of the collected heat for heating the rooms, the heat transporting fluid is passed to the storage apparatus, where the heat carried along is absorbed in the storage medium. When the heat stored is needed for heating purposes, heat transporting fluid is passed through the storage apparatus for absorbing heat from the storage medium whereafter the heated transporting fluid is conducted to the rooms to be heated. In addition to a system as described above, there may of course be provided a conventional heating system for supplementary heating.

It is an object of the present invention to improve the storage apparatus described above, and to provide an apparatus which operates extremely effectively. It is a further object of the invention to provide a suitable heat exchanger element for use in such a storage apparatus.

According to the invention, the object stated is achieved with a storage apparatus comprising a plurality of heat exchanger elements disposed within the housing, each heat exchanger element comprising a central portion containing the storage medium, surrounded by portions through which both heat transfer fluids can be conducted. A plurality means in this connection any suitable number. If so desired, the entire storage apparatus may consist of a single heat exchanger element.

Preferably, in the apparatus according to the invention, each heat exchanger element comprises a central tubular body for the storage medium, a first cylindrical jacket disposed concentrically around, and secured to, said tubular body so as to define a first cylindrical passage of substantially annular cross-sectional configuration between the tubular body and the jacket, and a second cylindrical jacket disposed concentrically around, and secured to, said first jacket so as to form a second cylindrical passage of substantially annular cross-sectional configuration between said first and said second jacket.

In a suitable embodiment, the tubular body and the first and second jackets disposed concentrically around it are secured together by means of a plurality of radially extending partitions or fins extending through by far the greater part of the length of the tubular body and the jackets. Preferably these partitions or fins consist of a material that is a good heat conductor, such as aluminum. The tubular body, the jackets and the partitions or fins of each heat exchanger element may be made in one piece. This promotes an economic production of such elements. They can be made in one piece, for example, by casting or extrusion.

If the apparatus according to the invention is used for storing heat, the heat transporting fluid is passed from the collectors through the storage apparatus, where it is conducted through the heat exchanger elements around the central members or tubes in which the storage medium is contained. The storage medium may be any conventional medium, but we prefer media of the type known by the name of eutectic salts or mixtures thereof. Examples of eutectic salts are GLAUBER salt, $CaCl_2 \cdot 6H_2O$, and $Ca(NO_3)_2 \cdot 4H_2O$. Such eutectic salts pass at a specific temperature or temperature range from a solid phase to a semi-liquid phase. This change in phase requires a considerable amount of energy, so that such a eutectic salt is capable of absorbing a considerable amount of heat during the transition. Conversely, when it returns from the semi-liquid to the solid phase, a considerable amount of heat will be released. As a consequence, eutectic salts are highly suitable for use as heat storage media. As the temperature range in which the change in phase takes place commonly lies in the vicinity of 30°–45° C., when eutectic salts are used as the storage medium the heat transporting medium is preferably air. In fact, such temperatures are less suitable for water as a transporting medium. There are more reasons why, in the system according to the present invention, air is preferred to water as the transporting medium. As a matter of fact, in a water system, attention must be paid to a good water-tightness of all the conduits and couplings. On the other hand, in air systems, the occurrence of possible minor leakages is less objectionable.

In the heat storage apparatus according to the present invention, the heat supplied by the heat transporting medium is absorbed by the storage medium, whereafter the transporting medium is passed back to the collectors for renewed heat absorption. When heat is to be withdrawn from the storage apparatus according to the invention, a heat transporting medium is passed through the apparatus around the bodies containing the storage medium for the absorption of heat from the storage medium. The heat transporting medium may be the same medium as used for the supply of heat to the storage apparatus. It is very possible, however, to use different medium, for example, air for one purpose, and water for the other. The medium thus heated in the apparatus is passed to the rooms to be heated, where it serves for heating purposes and gives up heat. Thereafter it is again passed to the storage apparatus for renewed heat absorption. The storage apparatus according to the invention is preferably arranged so that the heat transporting medium which supplies heat from the collectors is passed through the apparatus in one direction, whereas the heat transporting medium which transports heat from the apparatus to the rooms to be heated is passed through the apparatus in the opposite direction. Thus, for example, when the heat exchanger elements are constructed from concentric tubes, the transporting medium which supplies heat is passed through the passage located closest to the central body containing the storage medium, whereas discharge of heat takes place through the passage located more to the outside.

The tubular body of the heat exchanger elements according to the present invention may be provided on both ends with a detachable cover for purposes of changing the storage medium and cleaning the tubular body, should this be desirable after prolonged operation. Furthermore, there may be provided in the tubular body, adjacent to at least one of the ends thereof, means for compressing the storage medium in the body. Such compressing means are particularly useful when a eutectic salt is used as the storage medium, for ensuring that the medium is continuously in proper contact with the wall, so that its heat-transmitting capacity is at all times as great as possible.

One embodiment of the invention will now be described with reference to the accompanying drawings, in which FIG. 1 is a diagrammatic view of a portion of a heating system comprising a collector and a storage apparatus according to the present invention;

FIG. 2 is a cross-sectional view of an embodiment of the storage apparatus according to the invention;

FIG. 3 is a cross-sectional view of the apparatus shown in FIG. 2, taken on the line III—III of FIG. 2;

FIG. 4 is a cross-sectional view of an embodiment of the heat exchanger element of the apparatus according to the invention; and FIG. 5 is a cross-sectional view of the element shown in FIG. 4, taken on the line V—V of FIG. 4.

FIG. 1 diagrammatically shows a portion of a heating system for a building, for example, a house. The system comprises a collector 1. Collector 1 can be of a conventional construction and serves for collecting solar heat, indicated by the arrows 2. The radiation 2 heats collector 1 and a heat transporting medium therein. The heat transporting medium, which for example, may be air or water, is passed through conduit 3 from collector 1 to the valve system 4. If there is a need for the direct further transportation of the medium to the rooms to be heated, system 4 is adjusted so that the heat transporting medium is passed further into the house through conduit 5. If there is no need for the medium to be passed directly to rooms to be heated, the valve system 4 is adjusted so that the medium is passed through conduit 6 to storage vessel 7. After being passed through storage vessel 7, the medium, which in storage vessel 7 gives up a large part of the absorbed heat to a heat storage medium present within vessel 7, is passed through conduit 8 and conduit 9 back to collector 1, where heat from the solar radiation 2 is again absorbed. If the heat transporting medium has been passed directly to rooms to be heated, it is thereafter also returned through conduit 9 to collector 1. A suitable pump or fan (not shown) is arranged in the system for transporting the transporting medium through collector 1 and the conduits.

If there is a need for the supply of heat to the rooms of the house at a moment when the collector does not collect solar radiation, for example during the night, heat transporting medium is passed through conduit 10 to storage vessel 7, subsequently through storage vessel 7, where heat is absorbed from the storage medium present therein, and subsequently through conduit 11 to the rooms to be heated. At that time, the valves and pump(s) or other means for transporting the heat transporting medium throughout the system are preferably adjusted so that there is no transportation of the heat transporting medium through collector 1 and the conduits to and from it.

FIG. 2 shows an embodiment of the heat storage vessel 7 according to the invention in cross-sectional view, and FIG. 3 illustrates a sectional view of this vessel, taken on the line III—III of FIG. 2.

Vessel 7 is built up from a cylindrical outer jacket 12, a cylindrical inner jacket 13 of smaller diameter than jacket 12, and arranged concentrically within jacket 12. The space between jackets 12 and 13 is filled with heat insulating material 14. Jacket 12 has, for example, a diameter of 100 cm and jacket 13 a diameter of 80 cm, so that the space within them is filled with a layer of approximately 10 cm insulating material. At the bottom, jackets 12 and 13 are secured in suitable manner to a base plate 21, which is also constructed so as to virtually prohibit the passage of heat from the interior of vessel 7 to the outside. At the top, vessel 7 is closed with a suitable cover 15, which is likewise provided with good heat insulation. Provided within vessel 7 are a plurality of heat exchanger elements 22, as best shown in FIG. 3. Insulating material 23 may be provided between the outer elements 22 and the inner jacket 13 of vessel 7.

Each element 22 comprises a central tube 16 which is closed at the top and bottom ends and filled with a suitable heat storage medium, for example, a material known by the name of eutectic salt. Surrounding the central tube 16 is a middle tube 17 of larger diameter, so as to form an annular passage between tubes 16 and 17. As illustrated in FIG. 2, heat exchanger elements 22 are mounted in vessel 7 so as to leave a space 20 between the ends of elements 22 and base plate 21 and a space 19 between the ends and cover 15. The annular passages between tubes 16 and 17 of each element 22 terminate at the bottom in a space 20 and at the top in space 19. Connected to space 19 is conduit 16, which is passed through the wall of vessel 7 at a suitable location. Also connected to space 20 is conduit 8, likewise passed through the wall of vessel 7 in a suitable manner. In operation, heat transporting medium, for example air, heated in a collector is passed through conduit 6 and introduced into space 19. Thence the medium moves through the annular passages around tubes 16 to space 20, during which passage heat is absorbed by, and stored in, the storage medium within tubes 16. Subsequently the heat transporting medium is discharged from vessel 7 through conduit 8.

Arranged concentrically around the middle tube 17 of each element 22 is an outer tube 18. Tube 18 is of larger diameter than tube 17, so that there is an annular passage between the two tubes. At the top of each element 22, these passages are interconnected and connected to conduit 11 passed through the wall of vessel 7. At the bottom of each element 22, the passages between tubes 17 and 18 are also interconnected and connected to conduit 10, passed through the wall of vessel 7. If and when required, a heat transporting medium can be supplied through conduit 10 and conducted through the passages between tubes 17 and 18, where it can absorb heat from the storage medium within tubes 16. Naturally, to this effect, means should be provided for transporting this heat from the storage medium to at least the wall of tubes 17, as will be described in more detail hereinafter. After the heat transporting medium has absorbed heat from the storage medium within tubes 16, it is passed through conduit 11 to rooms to be heated in the building where the heat storage apparatus is installed.

The construction of a heat storage element as preferably implemented in accordance with the present invention is illustrated in more detail in FIGS. 4 and 5. As described above, the element comprises a central tube 16, closed at both ends, and containing a suitable heat storage medium. Disposed concentrically around tube 16 are a tube 17 of larger diameter and a tube 18 of still larger diameter. As shown by the cross-sectional view of FIG. 5, tubes 16, 17 and 18 are secured together by means of a plurality of radial fins 28. Fins 28 preferably extend throughout the length of element 22. Tubes 16, 17 and 18 and fins 28 are preferably made of a material which is a good heat conductor, for example, aluminium. The entire construction of tubes and ribs is suitably made in one piece, for example, by casting or extruding. As the material of the element is a good heat conductor, when hot heat transporting medium is supplied in the passage between tubes 16 and 17, this heat will be rapidly transmitted to the heat storage medium in tube 16. Conversely, heat will be rapidly transmitted from the storage medium to a heat transporting medium which is passed through the passage between tubes 17 and 18.

In order that, after prolonged use of element 22, the heat storage medium in tube 16 may be changed, and if desired, tube 16 may be cleaned, tube 16 is closed at the bottom, as shown in FIG. 4, with a removable cover 24, for example, a threaded cover, which is screwed to the end concerned. At the top, tube 16 is also closed with a removable cover 25, which may also be a screw cover. Provided at the top within tube 16 is a further compression member 26, for example, in the form of a plate of suitable material. Compression member 26 is dimensioned so as to be capable of moving up and down within tube 16 without the storage medium being capable of moving upwards between members 26 and the inner wall of tube 16. Member 26 is maintained under pressure onto the storage medium by means of, for example, a spring 27 arranged between cover 25 and member 26. In operation, the heat storage medium will expand when it absorbs heat, so that member 26 is moved upwards. When the material shrinks again after giving up its heat, member 26 will ensure that the entire volume under member 26 remains filled with storage medium and that, in particular, a good contact between the storage medium and the wall of tube 16 is ensured.

Other embodiments of the compression system are possible. Thus, instead of a compression member 26, a resilient diaphragm may be arranged in the tube direct over the storage medium, and a gas under pressure can be provided between cover 25 and the diaphragm. When the storage medium expands, this will push the diaphragm upwards; as a consequence the superjacent gas is compressed. When the storage medium contracts again, it will be kept properly compressed by the action of the compressed gas above the diaphragm.

Although the invention has been shown and described with reference to a preferred embodiment of the storage apparatus, it will be clear that the invention is not so limited. In particular, the arrangement of the heat exchanger elements in vessel 7 can be modified. Furthermore, the shape of elements 22 can be varied. The functions of the passages between tubes 16 and 17 and between tubes 17 and 18 are interchangeable. Other variants of the embodiment shown and described can be conceived by those skilled in the art without departing from the scope of the invention.

I claim:

1. An apparatus for storing solar heat comprising:
   at least one solar collector having means for passing a first heat transfer fluid therethrough;
   a housing;
   a plurality of heat exchange elements disposed within said housing, each of said heat exchange elements comprising a heat storage medium disposed centrally therein and occupying at least a portion of said housing;
   means for circulating said first heat transfer fluid from said solar collector through said heat exchange elements in heat exchange relationship with said heat storage medium;
   means for returning said first heat transfer fluid from each of said heat exchange elements to said solar collector; and
   means for passing a second heat transfer fluid through each of said heat exchange elements in heat exchange relationship with said storage medium and for thereafter discharging said second heat transfer fluid from said apparatus, said first and second heat transfer fluids being isolated from each other.

2. Apparatus as claimed in claim 1, wherein each heat exchange element comprises:
   a central tubular body containing said storage medium;
   a first cylindrical jacket disposed concentrically around, and secured to, said tubular body to define a first cylindrical passage having a substantially annular cross-sectional configuration and being located between said tubular body and said first jacket; and
   a second cylindrical jacket disposed concentrically around, and secured to, said first jacket to form a second cylindrical passage having a substantially annular cross-sectional configuration and being located between said first and said second jacket.

3. Apparatus as claimed in claim 2, wherein said tubular body and said first and said second jackets are secured together by a plurality of radially extending fins extending along at least a portion of the length of said tubular body and said first and said second jackets.

4. Apparatus as claimed in claim 2 or 3, wherein said tubular body includes a detachable cover disposed at each end thereof.

5. Apparatus as claimed in claim 4 wherein said circulating means passes said first heat transfer fluid through said first cylindrical passage in one direction and said passing means passes said second heat transfer fluid through said second cylindrical passage in a second direction opposite to said one direction of said first heat transfer fluid.

6. Apparatus as claimed in claim 2 or 3, further comprising means for compressing said storage medium in said tubular body, said compressing means being disposed within said tubular body adjacent at least one of the ends thereof.

7. Apparatus as claimed in claim 6 wherein said circulating means passes said first heat transfer fluid through said first cylindrical passage in one direction and said passing means passes said second heat transfer fluid through said second cylindrical passage in a second direction opposite to said one direction of said first heat transfer fluid.

8. Apparatus as claimed in claim 3, wherein at least said fins of each heat exchanger element are comprised of a heat conducting material.

9. Apparatus as claimed in claim 8 wherein said circulating means passes said first heat transfer fluid through said first cylindrical passage in one direction and said passing means passes said second heat transfer fluid through said second cylindrical passage in a second direction opposite to said one direction of said first heat transfer fluid.

10. Apparatus as claimed in claim 3, wherein said tubular body, said first jacket and said second jacket and said fins of each heat exchanger element are made in one piece.

11. Apparatus as claimed in claim 10 wherein said circulating means passes said first heat transfer fluid through said first cylindrical passage in one direction and said passing means passes said second heat transfer fluid through said second cylindrical passage in a second direction opposite to said one direction of said first heat transfer fluid.

12. Apparatus as claimed in claim 2 or 3 wherein each of said heat exchange elements further comprises means for compressing said storage medium in said tubular body, said compressing means being disposed within said tubular body adjacent at least one end thereof.

13. Apparatus as claimed in claim 2 or 3 wherein said circulating means passes said first heat transfer fluid through said first cylindrical passage in one direction and said passing means passes said second heat transfer fluid through said second cylindrical passage in a second direction opposite to said one direction of said first heat transfer fluid.

14. Apparatus as claimed in claim 1, wherein said storage medium is comprised of a eutectic salt.

15. Apparatus as claimed in claim 14, wherein said circulating means passes said first heat transfer fluid through said first cylindrical passage in one direction, and said second heat transfer fluid passing means passes said second heat transfer fluid through said second cylindrical passage in a second direction opposite to said one direction of said first heat transfer fluid.

16. An apparatus for storing solar heat comprising:
at least one solar collector having means for passing a first heat transfer fluid therethrough;
a housing;
a plurality of heat exchange elements disposed within said housing, each of said heat exchange elements comprising:
a central tubular body containing a heat storage medium;
a first cylindrical jacket disposed concentrically around and secured to said central tubular body to define a first cylindrical passage located between said central tubular body and said first cylindrical jacket and having a substantially annular cross-sectional configuration; and
a second cylindrical jacket disposed concentrically around and secured to said first cylindrical jacket to form a second cylindrical passage between said first cylindrical jacket and said second cylindrical jacket and having a substantially annular cross-sectional configuration;
means for circulating said first heat transfer fluid from said solar collector through one of said first and said second cylindrical passages of each of said heat exchange elements in heat exchange relationship with said heat storage medium;
means for returning said first heat transfer fluid from each of said heat exchanger elements to said solar collector; and
means for passing a second heat transfer fluid through the other of said first and said second cylindrical passages of each of said heat exchange elements in heat exchange relationship with said heat storage medium and for thereafter discharging said second heat transfer fluid from said apparatus.

17. Apparatus as claimed in claim 12 wherein each of said heat exchanger elements further comprises a plurality of fins extending radially from said central tubular body through said first and said second cylindrical jackets for securing together said central tubular body, said first cylindrical jacket and said second cylindrical jacket, said radially extending fins extending axially along most of the length of said central tubular body and said first and said second cylindrical jackets.

18. Apparatus as claimed in claim 16 or 17 wherein said central tubular body of each of said heat exchange elements comprises a detachable cover disposed at each end thereof.

19. In an apparatus for storing solar heat which includes at least one solar collector having means for passing a first heat transfer fluid passing therethrough, a housing, a heat exchanger disposed within said housing, means for circulating said first heat transfer fluid from said solar collector through said heat exchanger and back to said solar collector, and means for passing a second heat transfer fluid through said heat exchanger and for thereafter discharging said second heat transfer fluid from said apparatus, a plurality of heat exchange elements disposed within said heat exchanger, each of said heat exchange elements of said heat exchanger comprising:
a central tubular body containing a heat storage medium; and
heat transfer portions surrounding said central tubular body through which each of said first and said second heat transfer fluids are conducted in heat exchange relationship with said heat storage medium, said first and said second heat transfer fluids being isolated from one another.

20. The heat exchange elements as claimed in claim 19 wherein said heat transfer portions comprise:
a first cylindrical jacket disposed concentrically around and secured to said tubular body to define a first cylindrical passage located between said tubular body and said first cylindrical jacket and having a substantially annular cross-sectional configuration; and
a second cylindrical jacket disposed concentrically around and secured to said first cylindrical jacket to form a second cylindrical passage located between said first cylindrical jacket and said second cylindrical jacket and having a substantially annular cross-sectional configuration.

21. The heat exchange elements as claimed in claim 22 wherein each heat exchange element further comprises a plurality of fins extending radially from said tubular body through said first cylindrical jacket and said second cylindrical jacket to secure together said tubular body, said first jacket and said second jacket, said fins extending axially along most of the length of said tubular body and most of the length of each of said first jacket and said second jacket.

22. The heat exchange elements as claimed in claim 20 or 21 wherein said tubular body comprises a detachable cover disposed at each end thereof.

23. The heat exchange elements as claimed in claim 22 further comprising means for compressing said storage medium within said tubular body, said compressing means being disposed within said tubular body adjacent at least one end thereof.

24. The heat exchange elements as claimed in claim 21 wherein at least said fins are comprised of a heat conducting material.

25. The heat exchange elements as claimed in claim 21 wherein said tubular body, said first jacket, said second jacket and said fins are formed together in one piece.

26. The heat exchange elements as claimed in claim 19 wherein said storage medium is comprised of a eutectic salt.

27. The heat exchange elements as claimed in claim 20 wherein said circulating means passes said first heat transfer fluid through said first cylindrical passage in one direction and said passing means passes said second heat transfer fluid through said second cylindrical passage in a second direction opposite to said one direction of said first heat transfer fluid.

* * * * *